United States Patent [19]

LaFitte et al.

[11] 4,113,911

[45] Sep. 12, 1978

[54] QUIET, STRONG CLOTH-LIKE TISSUE LAMINATE

[75] Inventors: Larry L. LaFitte, Memphis, Tenn.; James B. Camden, Cincinnati, Ohio

[73] Assignee: The Buckeye Cellulose Corporation, Cincinnati, Ohio

[21] Appl. No.: 741,640

[22] Filed: Nov. 15, 1976

Related U.S. Application Data

[63] Continuation of Ser. No. 528,611, Dec. 2, 1974, abandoned.

[51] Int. Cl.² .............................................. B32B 7/00
[52] U.S. Cl. ................................... 428/284; 428/287; 428/289; 428/304; 428/920
[58] Field of Search ............... 156/290, 291, 306, 308, 156/309; 428/284, 286, 290, 296, 297, 304, 925

[56] References Cited

U.S. PATENT DOCUMENTS

| | | | |
|---|---|---|---|
| 3,301,746 | 1/1967 | Sanford et al. | 162/113 |
| 3,629,047 | 12/1971 | Davison | 428/110 |
| 3,770,562 | 11/1973 | Newman | 156/309 |
| 3,862,877 | 1/1975 | Camden | 428/253 |

*Primary Examiner*—James J. Bell
*Attorney, Agent, or Firm*—John V. Gorman; Richard C. Witte; Thomas H. O'Flaherty

[57] ABSTRACT

Improved tissue, continuous filament nonwoven laminates which are characterized by relatively high strength or toughness, relatively high loft and drape together with low noise or paper-like rattle. The improved tissue, continuous filament nonwoven laminates, while exhibiting a relatively high strength, are comprised of a low tensile strength, low basis weight, lightly bonded or unbonded layer of continuous filament nonwoven which is impregnated with about 50% to about 120%, based on the continuous filament nonwoven layer basis weight, of soft, tacky latex solids. The impregnated continuous filament nonwoven is combined under minimum combining pressures, while in the impregnated moist state between at least two, soft absorbent tissue facing layers prior to drying the laminate and curing the latex solids.

9 Claims, 8 Drawing Figures

QUIET, STRONG CLOTH-LIKE TISSUE LAMINATE

CROSS-REFERENCE TO RELATED APPLICATION

This application is a continuation of application Ser. No. 528,611 filed Dec. 2, 1974, now abandoned.

BACKGROUND OF THE INVENTION

This invention relates to tissue laminates and to methods of combining tissue layers with continuous filament nonwoven layers to produce strong, pliable and quiet cloth-like tissue laminates. The present laminate exhibits a characteristics and unexpected low level of the paper-like rattle heretofore present in such tissue laminates and can be produced as liquid absorbent and/or repellent cloth-like laminates as sheet materials suitable for use as surgical draping, clothing, toweling, bed clothing, tenting and other uses normally reserved to woven materials.

Specifically, the invention consists of impregnating a low basis weight, lightly bonded or unbonded, continuous filament central layer with soft, tacky, pliable non-migratory latex solids applied from viscous emulsions. The impregnated central layer of continuous filament nonwoven material is thereafter combined between at least two, facing layers of absorbent, soft tissue paper while in the moist state. The combining is accomplished with low pressures prior to drying and curing the resulting laminate sheet material. The product laminate can be made fire resistant, highly liquid absorbent and/or repellent. Conventional post treatments such as button breaking, micro-creping, surface brushing and conventional dry or wet creping can also be accorded to the dried and cured laminate to further enhance its softness, handle and drape.

Heretofore, tissue laminates having been prepared by a variety of methods using various central and facing layers and achieving greater or lesser success in achieving cloth-like laminate properties. In certain instances, the resulting laminates have been provided with scrim materials as reinforcement. The objective, in these applications of the laminating art, has been to develop laminates with cloth-like attributes with respect to strength, noise, drape, handle, and absorbency.

Practitioners of the laminating arts have found it difficult or impossible to engender all of the above desired functional attributes in a single sheet. This is to say that, if in a conventional instance, the laminated sheets were combined and then impregnated by spraying or dipping with a migratory latex; the resulting laminated suffered in absorbency and in surface feel. Further, if such a through bonded laminate was given a centrally disposed layer of bonded scrim or continuous filament nonwoven reinforcement sufficiently strong to engender cloth-like strength, the resulting laminate was rendered stiff and unpliable. Similarly, if a laminate having a central impregnated layer is combined by heat and pressure after drying the central layer, the resulting laminate has been found relatively noisy.

In particular, practitioners of the laminating art, while showing improvement in their skills and materials selection, have found the diminishment or abrogation of noise, the rattle associated with paper sheets, to be a continuing probelm in nonwovens and laminates otherwise approaching the duplication of cloth-like physical properties.

In brief, although those skilled in the art of laminate preparation have continued to improve their products, their efforts, while producing laminates improved in many respects and used as substitutes for woven cloth in selected and restricted applications, have not yet resulted in laminates possessing the drape, strength and noise qualities of woven cloth.

Notable examples of processes for the preparation of sheet and laminate materials are set forth in early patents, for example, U.S. Pat. No. 1,660,924, issued to Ernest Hopkinson on Feb. 28, 1928, while later patents such as U.S. Pat. No. 2,668,787, issued to August F. Schramm, Jr. on Feb. 9, 1954, illustrate methods of reinforcement. Additional patents, for example U.S. Pat. No. 2,923,653, issued to Nathaniel A. Matlin and Benjamin B. Kine on Feb. 2, 1960; U.S. Pat. No. 2,931,749, issued to Benjamin B. Kine and Nathaniel A. Matlin on Apr. 5, 1960; U.S. Pat. No. 2,954,816 and U.S. Pat. No. 2,954,817, issued to Robert A. Havemann on Oct. 4, 1960; U.S. Pat. No. 3,063,454, issued to Herbert W. Coates and Roland A. Frate; U.S. Pat. No. 3,546,056, issued to Gordon D. Thomas on Apr. 29, 1968; U.S. Pat. No. 3,567,566, issued to Werner Bandel, Herbert Hilpert, Hans Treckmann and Ernst Pirot on Mar. 2, 1971 and U.S. Pat. No. 3,629,047, issued to Robert W. Davison on Dec. 21, 1971 have served to further the arts of sheet impregnation, laminati and reinforcement. Other patents, including Belgian Pat. No. 710,228, issued to Aktiebolaget Billingsfors-Langed on June 17, 1968; British Pat. No. 1,116,826, issued to Aktiebolaget Billingsfors-Langed on June 12, 1968; British Pat. No. 1,200,235, issued to Aktiebolaget Billingsfors-Langed on July 29, 1970 and British Pat. No. 1,185,227, issued to Consolidated Paper (Bahamas) Limited on Mar. 25, 1960 have similarly advanced the art of sheet lamination.

Further patents, which have disclosed improvements in the art of sheet lamination or materials used in laminates and wherein filament nonwovens are disclosed are U.S. Pat. No. 3,314,841, issued to Bruno Romanin on Apr. 18, 1967; U.S. Pat. No. 3,341,394 issued to George A. Kinney on Sept. 12, 1967; U.S. Pat. No. 3,600,262 issued to Daniel H. Frank on Aug. 17, 1971; U.S. Pat. No. 3,639,199 issued to Theodorus G. Brandts, Joseph A. Lichtenberger and Joseph M. Bentvelzen on Feb. 1, 1972; U.S. Pat. No. 3,674,594 issued to Leif R. Persson on July 4, 1972; U.S. Pat. No. 3,695,985 issued to Robert J. Brock and Gordon D. Thomas on Oct. 3, 1972; U.S. Pat. No. 3,770,562 issued to Nicholas S. Newman on Nov. 6, 1973 and U.S. Pat. No. 3,809,077 issued to Paul E. Hansen on May 7, 1974.

Applicants have unexpectedly discovered, however, that the cloth-like physical properties of tissue, nonwoven laminate constructions can be considerably enhanced and improved, with particular respect to noise or rattle diminishment, over the disclosures and suggestions available in the prior art.

The continuous filament nonwovens contemplated for use together with tissue layers in the present advantageous quiet, strong laminate are particularly processed and selected continuous filament nonwovens falling within the broad scope of U.S. Pat. No. 3,341,394, cited above. It is, however, considered critical to achievement of the present rattle diminishment, drape and handle objectives that the continuous filament nonwovens used be in a low specified weight range and have little or no inter-fiber bonding prior to impregnation, i.e., are only lightly bonded or substantially unbonded.

As will be more fully set forth below, the present improvement in laminate noise or rattle level to approach the noise level of cloth in comparison with laminates of like basis weight and strength is believed by applicants to stem from novel and unobvious selection juxtapositioning of laminate layer elements, particularly this juxtapositioning of a continuous filament only lightly bonded or unbonded nonwoven layer between at least two facing tissue layers of absorbent soft tissue paper, together with processing methods particularly combining the layers under low combining pressures while in the wet state prior to drying and curing of the resulting laminates. In particular, it is considered necessary to employ soft, tacky, nonmigratory latex binder solids in a viscous emulsion to achieve the present low noise, high strength laminates. It is further considered essential that the amount of binder solids applied to the continuous filament nonwoven laminate layer fall within a specified relatively high range for binder solids addition, although due to the low basis weight of the continuous filament layer, the resulting laminates have a relatively low amount of binder solids content, based on total laminate basis weight. Surprisingly the resilience and loft of the consolidated but only lightly bonded or substantially unbonded nonwoven continuous filament spunbonded web and the low combining pressures employed to bring together the present laminate layers in the wet state results in a relatively high thickness or loft laminate and also reduces noise or rattle in the resulting laminate without substantially affecting the strength and drape thereof. This result was unexpected by applicants, because increased thickness is normally associated with higher bending moments, together with decreased drapeability and handle.

An additional feature which can be incorporated in the present laminate is where, for example, different color, absorbency or surface texture characteristics are desirable in the two opposing laminate surfaces. Differences in these laminate attributes can be engendered in the present laminate, where they would be difficult or impossible to develop in woven materials, by facing layer selection and or mechanical and chemical treatments prior, during or subsequent to laminate formation.

SUMMARY OF THE INVENTION

In accordance with the present invention, it has been found that an improved tissue laminate material having cloth-like qualities of strength, drape, low static electricity, potential absorbency and diminished noise generation or rattle in movement, as improved over previous laminates of comparable basis weight, can be achieved. The improved quiet, strong cloth-like tissue laminate can be prepared by first impregnating a central layer of light weight, continuous filament, only lightly bonded or substantially unbonded non-woven material, having a basis weight of about 0.3 to about 0.8, preferably about 0.6 oz. per square yard, with soft, tacky latex binder solids applied from liquid emulsions of the resins in relatively high quantities, based on the central layer weight. The latex binder solids in such liquid emulsions, suitable for use in practicing the present invention, have a glass transition temperature of about 10° C. to about $-80°$ C., preferably $-30°$ C., and a tack test, as defined hereinafter, of about 2 pounds to about 40 pounds, preferably about 7 pounds to about 20 pounds. Sufficient amounts of the aqueous emulsions of latex binder solids are applied to the central layer, by conventional means, such as spraying, padding and dipping, to insure uniform deposition of about 50 to about 120%, preferably about 85 to about 100%, of latex binder solids, based upon the fibrous weight of said central layer. As is believed apparent, processes such as spraying, padding and dipping generally distribute the emulsions continuously of the layer. As will be discussed below, adherence to the range of latex binder solids addition, use of latex binder solids exhibiting the stated physical attributes, in a liquid emulsion and wet combining under low combining pressures of light-weight, low-bonding (i.e., the use of only lightly bonded or substantially unbonded) in the central layer of continuous filament non-woven material between absorbent facing tissue layers with subsequent curing and drying, together with tissue weight selection are all considered essential to attainment of the present strong, cloth-like tissue laminate exhibiting low noise or rattle when compared to similar laminates in the prior art.

Subsequent to central layer impregnation and while said central layer remains moist or wet, the impregnated central layer of, for example, spun-bonded continuous filament only lightly bonded or unbonded non-woven is wet combined between at least two absorbent tissue facing layers, having basis weights of about 7 to about 18, preferably about 9 to about 15, lbs. per 3,000 square feet. The combining takes place under minimal pressure conditions while application of the latex binder solids is accomplished from sufficiently liquid emulsions to insure substantial penetration of the absorbent facing tissue layer or layers by latex binder solids. It is an additional characteristic of the present clothlike laminate products that they are extremely amenable, as contrasted with conventional sheet laminates, to the full development of their pliability and drape by the application of mechanical compaction or post working treatments such as creping, microcreping by confinement on a roll surface beneath a rubber belt at varying tension, embossing treatments and "button breaking" as conventionally employed by those skilled in the art. It is further considered preferable, although not essential, in practicing the present invention that the tissue layers comprising the laminate be prepared according to the disclosure and claims of U.S. Pat. No. 3,301,746, issued to Lawrence H. Sanford and James B. Sisson on Jan. 31, 1967.

It is, accordingly, a principal object of this invention to provide a latex resin bonded, strong clothlike tissue laminate with its latex resin binder solids content in substantial penetration of the laminate layers, which strong clothlike tissue laminate exhibits enhanced drape, pliability and handle together with a surprising lack of noise or paper-like rattle as compared to conventional tissue laminates.

It is a further principal object of this invention to provide latex bonded, quiet, strong clothlike tissue laminates wherein pliable, tacky, latex binder solids are initially deposited in a central continuous filament only lightly bonded or unbonded spunbond layer as a continuously distributed emulsion, subsequently wet combined under low combining pressures between at least two absorbent tissue facing layers and thereafter cured and dried.

Yet another principal object of this invention is to provide a non migratory latex bonded, quiet, strong clothlike tissue laminate comprised of a central, relatively heavily latex impregnated continuous filament only lightly bonded or unbonded spunbond layer wet combined at low combining pressures between at least two absorbent facing tissue layers substantially penetrated by the latex.

BRIEF DESCRIPTION OF THE DRAWINGS

Other objects and advantages of this invention will become apparent as the description thereof proceeds in accordance with, and as illustrated by, the drawing wherein like numbers refer to like components in each figure illustrating preferred embodiments of the present quiet strong cloth-like tissue laminate. Additional figures depicting oscilloscope traces of the noise or "rattle" generated by cloth, a conventional tissue-spunbond nonwoven laminate, laminates, preferred embodiments of the laminate of this invention and Kraft paper are provided to further illustrate together with noise comparison rankings the important beneficial noise reduction aspect of the invention.

DESCRIPTION OF THE PREFERRED EMBODIMENTS

Figure 1:
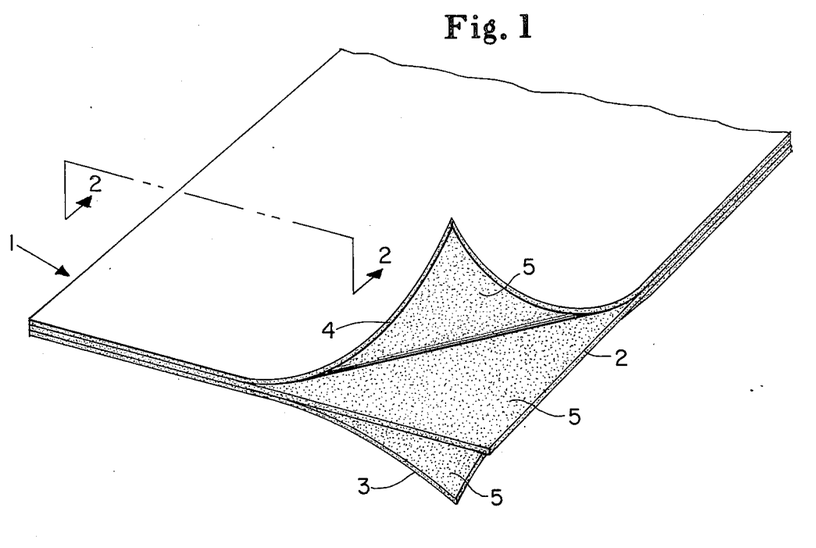
FIG. 1 is an isometric plan view of a preferred embodiment of the quiet, strong cloth-like tissue laminate of the present invention with the facing tissue layer corners turned back to fully illustrate the central impregnated continuous filament non-woven layer and its relationship to the facing tissue layers.

Referring now to FIG. 1 of the drawings, there is illustrated a quiet strong cloth-like tissue laminate 1 comprising a central spunbond non-woven layer 2, a low tensile strength, low basis weight, lightly bonded or unbonded continuous filament non-woven, together with absorbent nether tissue layer 3 and absorbent upper tissue layer 4. The individual absorbent tissue layers, absorbent nether tissue layer 3 and absorbent upper tissue layer 4, have basis weights of about 7 to about 18, preferably about 9 to about 15, lbs. per 3,000 square feet. Central spunbond non-woven layer 2 has a basis weight of about 0.3 to about 0.8, preferably about 0.6, oz. per sq. yd.

As stated, the individual tissue layers, absorbent nether tissue layer 3 and absorbent upper tissue layer 4, as well as the central only lightly bonded or unbonded spunbond non-woven layer 2 each have a stated range of basis weights and preferred basis weights. Quiet, strong, cloth-like tissue laminate 1 can be prepared from individual tissue layers and central spunbonded layers each having different basis weights within the above specified ranges. For example, central spunbonded layer 2 can have a basis weight of 0.3 oz. per sq. yd. while nether tissue layer 3 and upper tissue layer 4 can each have a basis weight of 8 lb. per 3,000 sq. ft. In other embodiments of cloth-like tissue laminate 1, each of the individual tissue layers 3 and 4 and central spunbonded layer 2 can each have either a different basis weight or central spun-bonded layer 2 can be faced with nether tissue layer 3 and upper tissue layer 4 having either a higher or lower basis weight than central spun-bonded layer 2. In this manner, quiet, strong cloth-like tissue laminate 1 can be adapted to have a single sidedness in basis weights and varying total basis weights can be achieved in quiet, strong cloth-like tissue laminate 1 for specific uses.

As heretofore stated, the individual tissue layers 3 and 4 of quiet strong cloth-like tissue laminate 1 are comprised of pliable absorbent tissue. Any conventional tissue layer having a basis weight within the specified range is suitable for use in embodiments of the invention and can be selected to enhance desired attributes. The individual absorbent tissue layers are preferably creped, or otherwise postworked in an equivalent manner, prior to combination in quiet, strong cloth-like tissue laminate 1. Due to the exemplary, soft, bulky and absorbent features engendered therein, a particularly preferable tissue for use in the preparation of the quiet strong cloth-like tissue laminate 1 is the paper tissue product disclosed and claimed in U.S. Pat. No. 3,301,746, issued to Lawrence H. Sanford and James B. Sisson on Jan. 31, 1967. The tissue product disclosed and claimed in U.S. Pat. No. 3,301,746 is characterized by having impressed in its surface, to a depth of at least 30% of its machine glazed caliper the knuckle pattern of an imprinting fabric having about 20 to about 60 meshes per inch, by having about 1% to about 14% of its surface compressed in said knuckle patterns to a relative density of at least 0.7 and by having a bulk density at 100 grams per square inch loading of about 1.0 to about 3.6, proportional to its basis weight.

Central spunbonded layer 2 is comprised of a low tensile strength, low basis weight, lightly bonded or unbonded layer of continuous filament non-woven material. The filaments of central spunbond layer 2 comprise polyester, polyamide and polyolefin fibers. As previously stated, central spunbond layer has a basis weight of about 0.3 to about 0.8 oz. per sq. yd., preferably about 0.6 oz. per sq. yd., and, although difficult or impossible of precise measurement, the bonding in central spunbond layer 2 prior to impregnation is believed by applicants to be less than 2% of the possible bonds at cross-over points in the continuous filaments. Such lightly bonded or unbonded nonwoven materials may conveniently be referred to as "consolidated".

Although applicants do not wish to be bound by statements of theory, the uniquely quiet cloth-like properties of the present quiet, strong cloth-like tissue laminate 1 are believed due in large measure to the use of a central consolidated (i.e., only lightly bonded or unbonded) continuous filament spunbonded layer in company with a concentration of soft, pliable latex binder solids 5 which are initially impregnated in central spunbond layer 2 as a liquid emulsion. During the wet combining of impregnated central spunbond layer 2 with absorbent upper tissue layer 4 and absorbent nether tissue layer 3, the soft pliable nonmigratory binder latex solids initially impregnated in central spunbond layer 2 penetrate in part into absorbent upper tissue layer 4 and nether absorbent tissue layer 3 to substantially penetrate same prior to drying and curing of the latex resin solids. The use of impregnations of latex binder solids 5 of specific properties, within the stated ranges, initially placed as a liquid emulsion in consolidated (i.e., only lightly bonded or unbonded) central spunbond layer 2 and penetrating to absorbent upper tissue layer 4 and absorbent nether tissue layer 3 during wet combining and subsequent drying and curing thereof is considered necessary to achievement of the quiet, strong cloth-like properties, including enhanced draping qualities and handle, of quiet, strong cloth-like tissue laminate 1. As used herein, "migration" is used in the sense generally accepted in the plastics industry and refers to: "The transfer of a constituent [generally a plasticizer] of a plastic compound to another contacting substance." Whitington's Dictionary of Plastics, Technomics Publishing Co., Inc., 1968. Penetration, on the other hand, refers to the transfer of the liquid emulsion into the tissue layers prior to drying and curing.

For use in the impregnation of central spunbond layer 2 in quiet, strong cloth-like tissue laminate 1, a water emulsion of soft, pliable latex binder solids 5 having glass transition temperatures of about 10° C. to about −80° C., preferably about −30° C. together with a tack test of about 2 pounds to about 40 pounds, preferably about 7 pounds to about 20 pounds, is employed. The water emulsions of latex binder solids 5 have a latex binder solids 5 content of about 40 to about 80%, preferably 50% by weight. The preferable water emulsions of latex binder solids 5 have a maximum mean particle size of about 5 microns. Latex binder solids 5 suitable for use in the present invention are polymers and co-polymers of acrylate esters, referred to generally as acrylics, vinyl acetate-ethylene copolymers, styrene-butadiene co-polymers, vinyl chloride polymers, vinylidene chloride polymers, vinyl chloride-vinylidene chloride co-polymers, acrylo-nitrile co-polymers and acrylic-ethylene co-polymers of acrylate esters, referred to generally as acrylics, vinyl acetate-ethylene copolymers, styrene-butadiene co-polymers, vinyl chloride polymers, vinylidene chloride polymers, vinyl chloride-vinylidene chloride co-polymers, acrylo-nitrile co-polymers and acrylic-ethylene co-polymers. The water emulsions of these latex binder solids 5 usually contain surfactants; preferably, the surfactants are modified during drying and curing so that they become incapable of rewetting. Of the latex binder solids enumerated, the acrylic polymer and vinyl acetate-ethylene co-polymer types are preferred. For example, an acrylic polymer water emulsion suitable for use in the invention is available from the Rohm & Haas Company under the designation E-920. A specific water emulsion of latex binder solids 5 of the vinyl acetate-ethylene co-polymer type is available from E. I. du Pont de Nemours & Co., Inc. under the designation SW-5-2685-2. Other acrylic polymer water emulsions suitable for use in the invention are available from the Celanese Company under the designation CPE-10645 and from the Rohm & Haas Company under the designation HA-8.

Referring again to FIG. 1, quiet, strong cloth-like tissue laminate 1 is produced by impregnating central spunbonded layer 2 with a liquid emulsion providing about 50% to about 120%, preferably about 85 to about 100%, based on the fibrous weight of central spunbonded layer 2, of soft, pliable latex binder solids 5 having the above stated physical properties. The stated range of latex resin binder impregnation in the central spunbond layer 2 wet combined, under low combining pressures so as to penetrate the absorbent facing tissue layers prior to curing and drying results in a quiet, strong cloth-like tissue laminate 1 containing overall a relatively low percentage of latex solids. Latex binder resin solids 5 are applied from the above stated liquid emulsions containing about 40 to about 80%, preferably about 65% by weight of latex binder solids 5. Such water emulsions of latex binder solids 5 can be applied by padding from rollers, spraying or other conventional systems for applying impregnation materials to paper including gravure and intaglio application processes.

Impregnated consolidated (i.e., only lightly bonded or unbonded) central spunbond layer 2 is immediately combined or laminated, after impregnation and while in the wet or moist state with absorbent nether tissue layer 3 and absorbent upper tissue layer 4 to form quiet, strong cloth-like tissue laminate 1. Combining preferably takes place in at least one low pressure nip between rolls under minimal pressure, for example, between soft rubber covered rolls or between one polished chrome plated roll and a rubber covered roll having a rubber covering of, for example, Durometer 50, to enhance and preserve bulk, hand and softness in quiet strong cloth-like tissue laminate 1. Other means of low pressure combining, for example, combining over a vacuum box or breaking over a bar can also be employed alone or in combination with roll nips.

Subsequent to wet combining, under low combining pressure of impregnated consolidated spunbond layer 2, absorbent nether tissue layer 3 and absorbent upper tissue layer 4, cloth-like tissue laminate 1 is thermally dried to drive off water and, if appropriate, cure the latex impregnants. Such thermal drying can be accomplished by conventional steam drum drying systems. Other conventional thermal drying systems employing either heated air circulating conveyor belts in enclosed tunnels or infrared sources can also be used to accomplish the thermal drying. Micro-wave oven drying can also be employed effectively in the process of this invention.

After drying, quiet, strong clothlike tissue laminate 1 is preferably accorded a mechanical post-working treatment to fully develop and enhance its excellent draping characteristics. This postworking treatment can be applied effectively by differential working with resulting microcreping wherein the combined and dried quiet, strong cloth-like tissue laminate 1 is confined between a rubber belt at varying tensions and a pulley face to produce microcreping in a system similar to that disclosed in U.S. Pat. No. 2,624,245 issued to Sanford L. Cluett on Jan. 6, 1953 and popularly known as "Clupaking." Mechanical compaction treatments resulting in about 1 to about 30%, preferably about 4 to about 20%, compaction have been found desirable and such treatments can be advantageously applied repetitively with intermittent or subsequent pullout of substantial amounts of the compaction. The mechanical working, which has been found advantageous, can also be accomplished by other mechanical treatments akin to creping or in passage through button breaking rolls. In the essence that the latex binder solids 5 are thermoplastic in nature, bonding and therefore resistance to delamination can be enhanced by post-treatment of the cloth-like laminates through the use of pressure in the nips of heated rolls in the overall or selected pattern. Applicant, however, prefers to avoid patterns producing overall compaction in such treatments.

Figure 2:
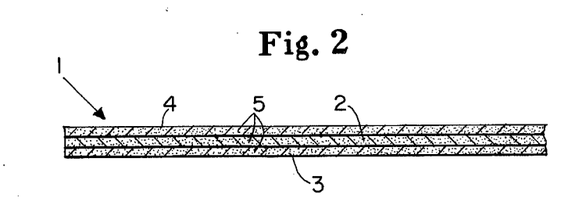
FIG. 2 is an enlarged cross-sectional view of the quiet, strong cloth-like tissue laminate illustrated in FIG. 1, which cross-sectional view illustrates placement of latex binder solids in liquid emulsions in the central continuous filament only lightly bonded or unbonded layer and the penetration of these latex binder solids into the absorbent facing tissue layers following wet combining at low combining pressures prior to drying and curing the quiet, strong cloth-like tissue laminate. The cross section of FIG. 2 is taken along the line 2—2 in FIG. 1.
Figure 3:
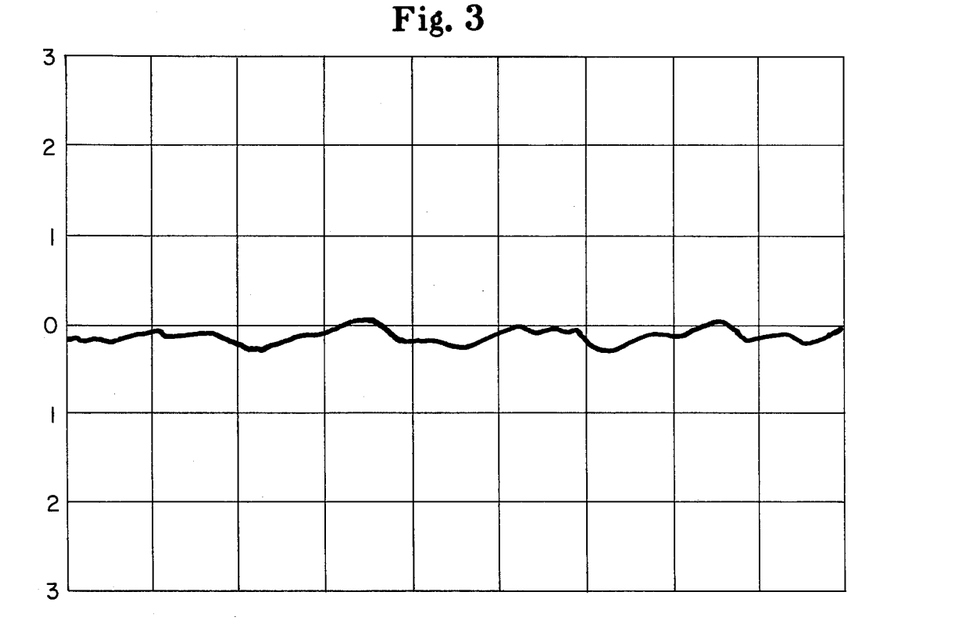
FIG. 3 is a drawing of an oscilloscope trace illustrating the appearance of normal background noise in a laboratory.

Referring now to the enlarged cross-sectional view of quiet, strong cloth-like tissue laminate 1 shown in FIG. 2, there is illustrated central spunbond layer 2, nether tissue layer 3 and upper tissue layer 4 with latex binder solids 5 shown therein as is also illustrated in FIG. 1. As stated heretofore, the unique qualities of absence of paperlike noise and rattle, drape, pliability, water and air porosity, strength exhibited by quiet, strong cloth-like tissue laminate 1 are believed due to wet combining, under low combining pressure of the consolidated (i.e., only lightly bonded or unbonded) central spunbond layer 2 with absorbent nether tissue layer 3 and absorbent upper tissue layer 4 with subsequent curing and drying to produce a quiet, strong cloth-like tissue laminate 1 having therein a central spunbond layer 2, a nether tissue layer 3 and an upper tissue layer 4 containing the stated quantity of specified type latex binder solids 5. As illustrated in FIGS. 1 and 2, the latex binder solids 5 are partially transferred while in the water emulsion from central spunbond layer 2 during wet combining and penetrate substantially into absorbent nether tissue layer 3 and absorbent upper tissue layer 4. Applicants have discovered that this combination of layers and latex resin binder solids of specified quantity and type and under the specified conditions achieves a uniquely cloth-like and exceptionally quiet, akin to cloth, strong cloth-like tissue laminate 1.

One preferred embodiment of the present invention employs as a central spunbonded layer 2, a spunbonded non-woven comprised of continuous polyester fibers having a basis weight of 0.6 oz. per sq. yd. together with a nether tissue layer 3 and an upper tissue layer 4 each of which tissue layers have a basis weight of 9 lbs. per 3,000 sq. ft.

Figure 6:
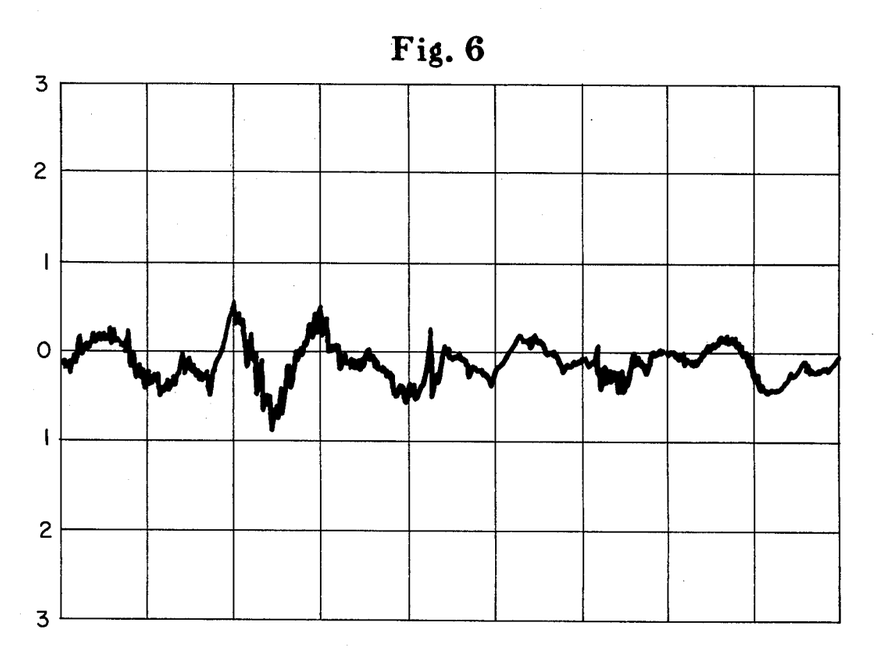
FIG. 6 is a drawing of an oscilloscope trace of the sound generated by shaking a laminate sample prepared according to the present invention and having the same tissue and nonwoven layers as those illustrated in FIGS. 1 and 2 wherein the central layer was impregnated with liquid dispersed binder solids and immediately combined in the moist state under minimal bonding pressure to form the laminate prior to drying and curing.

This preferred embodiment of quiet, strong cloth-like tissue laminate 1 is the sample whose noise is illustrated in FIG. 6 and is produced by first impregnating said central spunbond layer 2 with about 100% of its fibrous weight of Celanese CPE 10645 acrylic resin solids as latex binder solids 5. These binder solids have a glass transition temperature of −30° C. and a tack test of 10 pounds. The latex binder solids 5 are applied from a water emulsion containing 50%, by weight of latex binder solids and having a Brookfield viscosity of 3200 using a number 2 spindle and a spindle rotation of 6 rpm.

The so-impregnated central spunbound layer 2 is combined, while wet with the impregnated water emulsion of latex binder solids 5, with the stated nether tissue layer 3 and upper tissue layer 4 under minimal pressure. The combined quiet, strong cloth-like tissue laminate is then dried, cured and can be microcreped or post-worked and surface brushed to improve its drape and handle. The microcreping induces an 8% compaction, and this preferred embodiment of the present invention exhibits the important characteristics therein of drape, quietness or lack of paperlike rattle together with sufficient penetration of the latex binder solids 5 to the outside surfaces of the quiet, strong cloth-like laminate to substantially prevent loss of fibers from the surface thereof, or linting, in use. Quiet, strong cloth-like tissue laminate 1 samples prepared according to this preferred embodiment exhibit a drape index of 2.6 to 1.8 together with a low load (0.21 lbs./sq. in.) thickness of approximately 10.6 mils.

Figure 5:
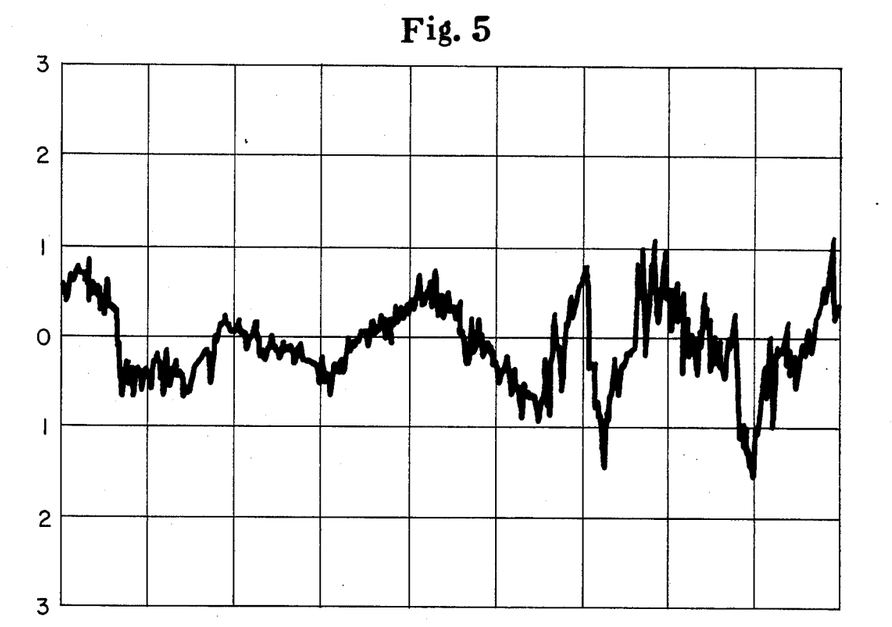
FIG. 5 is a drawing of an oscilloscope trace of the sound generated by shaking a laminate sample not of the present invention but having tissue and nonwoven layers illustrated in FIGS. 1 and 2. Contra to the wet combining of the present laminates, in the laminate sample shaken to produce the oscilloscope trace of FIG. 5, the central layer was impregnated with thermoplastic binder solids and dried prior to forming and bonding the laminate by application of heat and pressure.

The sample, not of this invention, whose noise is illustrated in FIG. 5, was produced with the same layers and impregnation loading of Rohm & Haas HA-8 acrylic resin solids as the foregoing preferred embodiment of FIG. 6. This sample, however, was combined under heat and pressure after initial drying of the impregnated central layer. This sample exhibited a low load thickness of 5.9 mils without postworking or surface brushing.

Figure 7:
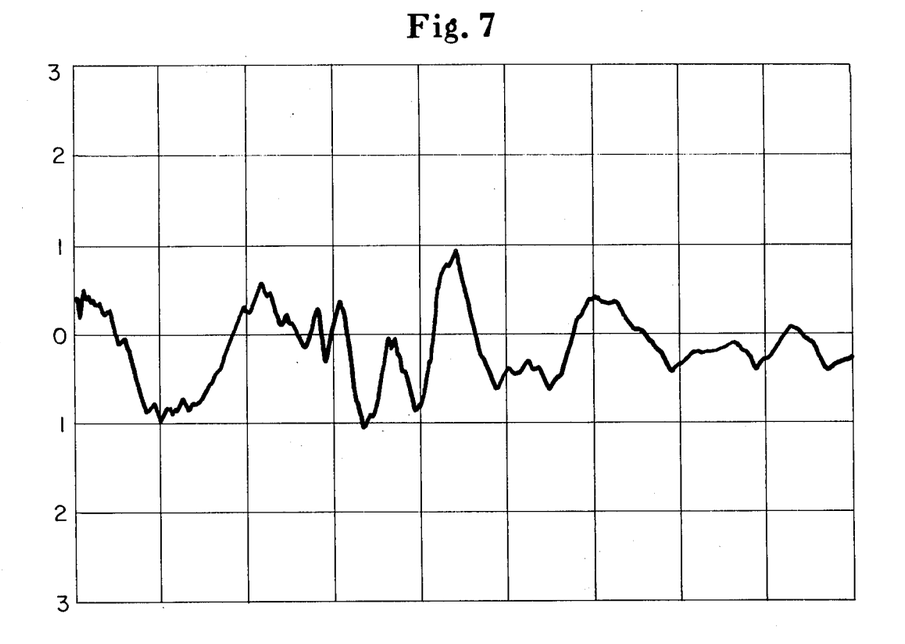
FIG. 7 is a drawing of an oscilloscope trace of the sound generated by shaking a laminate sample of the present invention differing from that used to generate the sound illustrated in FIG. 6 only by having heavier tissue facing layers within the limits stated herein.

Additional preferred embodiment samples whose characteristic noise is illustrated in FIG. 7 were prepared according to the procedure of the preferred embodiment whose noise is illustrated in FIG. 6 with the exception that nether tissue layer 3 and upper tissue layer 4 both had a basis weight of 15 lbs. per 3000 sq. ft. These samples exhibited a drape index of 1.8 to 1.3 together with a low load thickness of approximately 13.2 mils.

Applicants have further noted a surprising and characteristic constancy in the thickness of the present laminates, expressed in meters, divided by their basis weight, expressed in grams per square meter. It has been found that these values range from about $3.4 \times 10^{-6}$ meters$^3$/gram to about $3.7 \times 10^{-6}$ meters$^3$/gram and appear more constant than like values for other laminates. The present laminates, despite their relatively weak individual layers, exhibit a strength, expressed as peak tensile strength, of about 5 to about 8.5 lbs./in. with a toughness, expressed as the work to reach peak tensile, of about 4 to about 8 in. lbs./sq. in.

In further preferred embodiments of quiet, strong cloth-like tissue laminate 1, as well as in the foregoing embodiments, dyes can be used to color one or more of the water latex emulsions, central spunbond non-woven layer 2, nether tissue layer 3 and upper tissue layer 4 for the purposes of opacity enhancement, color identification, low light reflectance, aesthetic enhancement and easy differentiation between sides of quiet strong cloth-like tissue laminate 1 having an absorbent side and a fluid repellent side. Other embodiments of the invention include those wherein all possible tissue layer and spunbond non-woven layer combinations of quiet, strong cloth-like tissue laminate 1 are made either water and alcohol repellent, or absorbent, and those wherein a flame retardant, for example ammonium chloride, ammonium sulfamate, diammonium phosphate, triammonium phosphate, or tris(2,3-dibromopropyl) phosphate, is included in central spunbond non-woven layer 2 in 5 to 30% amounts, based on the total weight of the impregnated central spunbond nonwoven layer.

Referring now to FIGS. 3 through 8, there are illustrated therein oscilloscope traces, produced under mechanically induced and repeatable conditions by shaking comparative samples.

The mechanically repeatable shaking was produced by driving a pin mounted on a rotor wheel and engaged in a slot in a pivotally mounted arm through 206.25 rpm. The length of the arm from pivot to drive slot engaged in the rotating pin and from the rotating pin to the end of the arm holding the sample was such as to provide an 8 inch amplitude of shake with a frequency of 206.25 per minute. The entire mechanical shaking device was made noiseless by covering the drive pin and drive slot in the shaking arm with rubber, by providing teflon bearings at the pivot point and rotor wheel mount and by driving the device with a rubber belt.

In ranking the clothlike noise or paper rattle made by shaking samples as presented in the drawings herein, a paired-comparison technique, based upon "An Analysis of Variance for Paired Comparisons" by Henry Scheffe, pp. 381–400, American Statistical Association Journal, September, 1952, was used wherein panelists listened to and compared tape recordings of the noise made by the several samples. The results of these comparisons were computerized and are presented in terms of average scores and yardstick difference measurements. The drawings, FIGS. 3 through 8, are drawn from the oscilloscope traces of the noise made by the several samples. Ranking results from inspection of the oscilloscope trace drawings have produced comparative ranking with the more sophisticated ranking by statistical noise comparison. The paired-comparison study makes possible a subjective ranking of up to six samples by subjective comparison of panelists for cloth-like noise. The panel listening to the tape recordings was divided into two groups and are described as the expert group of ten people who were familiar with nonwoven materials, and the non-expert group consisting of 20 people who were not familiar with nonwoven products.

Since noise was the only characteristic of interest during the test, a high fidelity tape recording of the noise generated by shaken sheet samples was used to eliminate any other sensory perception such as brand, color or feel. A two-channel tape with samples recorded side-by-side allowed a panelist to switch back and forth between sounds during each comparison until the panelist decided which sample had the more cloth-like noise. Prior to the actual testing, the panelists were given an opportunity to listen to the actual noise made by cloth and paper so that they could become familiar with the sounds as recorded on the tapes.

In conducting the sampling, each sheet sample to be recorded and heard by the panelist was cut into a 12 × 12 inch sample, and the samples were conditioned overnight in the room where the testing equipment was located. A testing room with a low background noise illustrated by oscilloscope trace in FIG. 3, temperature and humidity control was selected. The low noise standard in these comparisons was a laundered muslin cloth, whose noise is illustrated by oscilloscope trace in FIG. 4, having the properties desirable in the nonwovens and samples being tested. Each of the samples compared to cloth was judged to have a higher noise, evidenced as a negative score, than cloth. The laminates of the present invention were judged less noisy then the other samples compared.

The comparison test was conducted by writing the names of the samples compared on individual pieces of paper and conducting a random drawing so that the name drawn first became sample No. 1 and so on. Following this first random drawing, all of the possible combinations for comparing one sample against another were written on individual pieces of paper according to the number of the first random drawing. Following this combination recording on individual pieces of paper, another random drawing was conducted to set the order of the panelists listening to the various pairs in the comparison. The shaking equipment insured that each 12 by 12 inch sample, loosely spanning a distance of 9.25 inches, was shaken the same way at a frequency of 206.25 strokes per minute and an amplitude of 8 inches. Each panelist saw a demonstration of the subjective test wherein the panelist was allowed to shake and rattle both paper and cloth samples by hand while listening to the resulting noise; the oriented panelist was then ready to begin the test series. After each paired-comparison listening, the panelist was asked the question, "Which of the two samples sounded more cloth-like in nature?" The panelist was also asked to what degree the noise sounded more cloth-like and the choices were as follows:

0 = no preference
1 = sounds more cloth-like
2 = sounds much more cloth-like

Each panelist was invited to alternate listening to the two samples during each comparison test until he decided which sample had the more cloth-like noise. A recording of the panelist preference in terms of the above choices was made. The data of the expert panelists was computerized into yardsticks and the data of the non-expert panelists was also computerized into yard sticks. A combined set of yardstick ratings of the samples was then made. A difference of one full yardstick between any two samples provides a 95% confidence level that a significant difference does exist between the two. The samples set forth in this application were rated as follows between cloth as a low noise sample and Kraft paper as a high noise sample.

Figure 4:
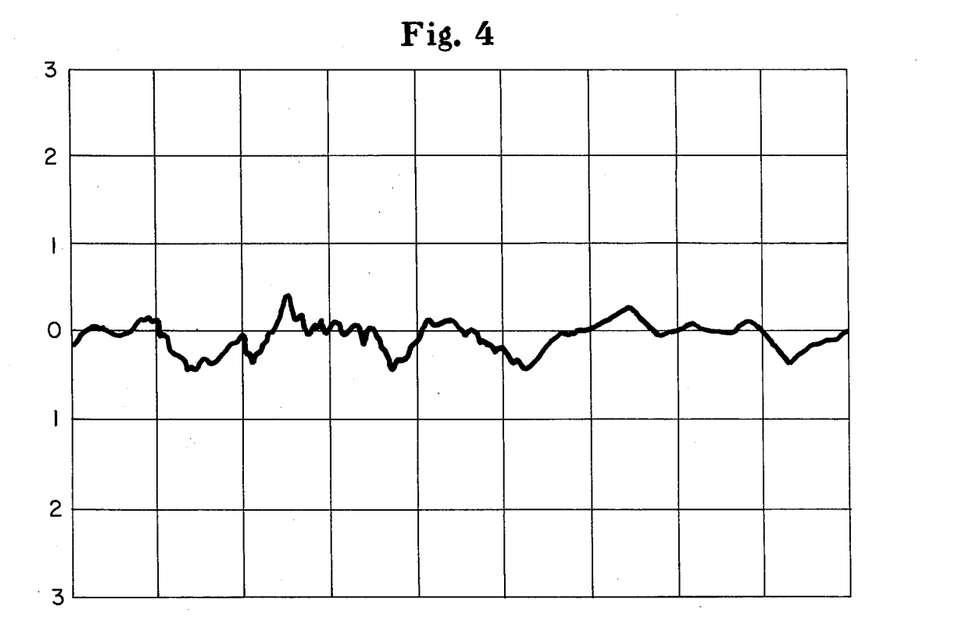
FIG. 4 is a drawing of an oscilloscope trace illustrating the typical wave form of the sound generated by shaking a sample of laundered muslin cloth.

| Sample | NOISE COMPARISON AND RATING | | | | | |
| --- | --- | --- | --- | --- | --- | --- |
| | Combined Yardstick Rating | Combined Average Score | Expert Panel Yardstick Rating | Expert Panel Average Score | Non-Expert Panel Yardstick Rating | Non-Expert Panel Average Score |
| FIG. 4-laundered muslin cloth | 0.00 | 0.00 | 0.00 | 0.00 | 0.00 | 0.00 |
| FIG. 5-comparison laminate (non-invention) wherein | | | | | | |

-continued

| | NOISE COMPARISON AND RATING | | | | | |
|---|---|---|---|---|---|---|
| Sample | Combined Yardstick Rating | Combined Average Score | Expert Panel Yardstick Rating | Expert Panel Average Score | Non-Expert Panel Yardstick Rating | Non-Expert Panel Average Score |
| central layer is impregnated & dried prior to combination under heat and pressure | −23.27 | −2.77 | −13.06 | −2.93 | −19.88 | −2.70 |
| FIG. 6-present laminate with 9 lb. per 3000 sq. ft. basis weight facing tissues and 0.6 oz. per sq. yd. central spunbond non-woven layer | −13.40 | −1.60 | −6.83 | −1.53 | −12.02 | −1.63 |
| FIG. 7-present laminate with 15 lbs. per 3000 sq. ft. basis weight facing tissues and 0.6 oz. per sq. yd. central spunbond non-woven layer | −11.87 | −1.41 | −6.75 | −1.51 | −10.06 | −1.36 |

Figure 8:
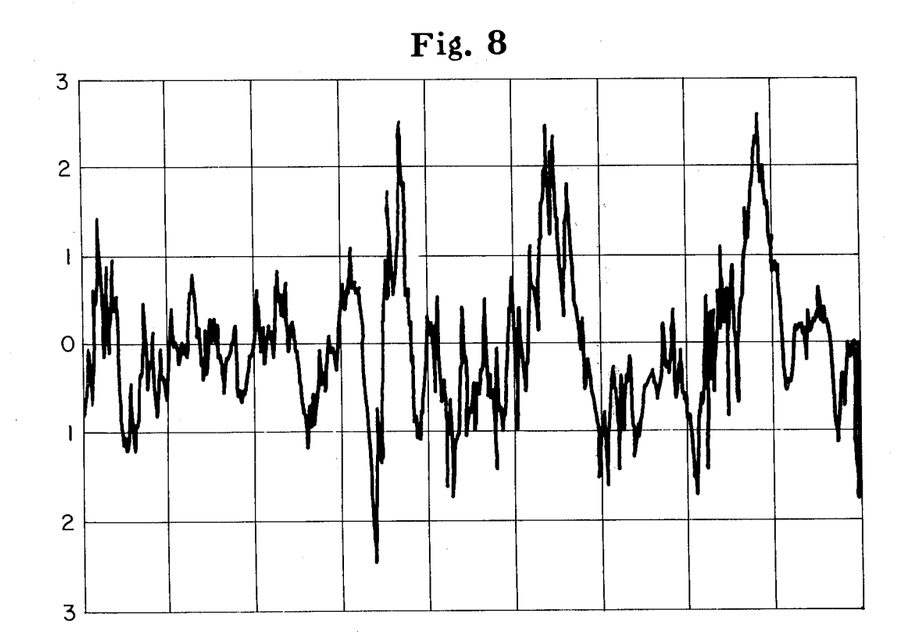
FIG. 8 is a drawing of an oscilloscope trace of the sound generated by shaking a sample of Kraft envelope paper, which drawing taken together with that of FIG. 4 illustrates the two extremes of desirable and undesirable sound waveform within which the sound waveform of the present laminate is located and is more nearly like cloth.

In the paired comparison ranking for noise the Kraft paper of FIG. 8, a Kraft envelope paper having a basis weight of 75 lbs. per 3,000 square feet, has been shown to be 27–30 yardsticks more noisy than the muslin cloth sample. Applicants have concluded that such noise comparison testing indicates the present tissue-continuous nonwoven laminates, as prepared by wet combining under low pressures, rank approximately twice as quiet (see FIGS. 6 and 7 oscilloscope traces) as do laminates wherein the continuous spunbond nonwoven layer is impregnated with thermoplastic binder solids and dried prior to forming and bonding by the application of heat and pressure (see FIG. 5 oscilloscope trace). As compared to the Kraft envelope paper (see FIG. 8 oscilloscope trace) the present laminates are approximately three times more quiet.

Tack tests and drape index values have been set forth herein to specify the properties, respectively, of the present latex binders and quiet, strong cloth-like tissue laminates. In describing the latex binder solids used to prepare the laminates, the tack test set forth is obtained by a test procedure wherein a 10 by 10 inch piece of laundered and ironed fine combed 100% cotton percale bed sheeting, having a thread count of 100 threads by 80 threads per inch is first cut. The 10 inch by 10 inch piece of bed sheeting is then backed with a piece of polyurethane film having a thickness of 1 mil. The bed sheeting - polyurethane film composite is then placed, film side down and flat, on a flat glass plate and secured thereto by pressure sensitive tape.

The test latex binder solids are then cast as a film upon the secured bed sheeting - polyurethane composite using an 8 inch wide Gardner knife, as supplied by Gardner Laboratory, Inc., Bethesda, Md. In casting the test film the Gardner knife is set to a clearance of 30 mils, and the water emulsion of latex binder solids to be tested is cast and allowed to dry overnight at a temperature of 75° F. In casting, the film area is stopped so that a strip of uncoated cloth 1 inch wide remains at the cloth edge.

After drying overnight a 4 by 5 inch sample is cut from the coated cloth to contain a 4 by 4 inch latex film coated area and a 1 by 4 inch uncoated area. A second 4 by 5 inch piece of the same laundered and ironed fine combed 100% cotton percale bed sheeting is placed coextensively on the latex film coated side of the dried latex film coated, 4 inch by 5 inch sample. The so formed composite of two 4 inch by 5 inch pieces of bed sheeting with dry latex film between is placed between two 4 by 4 inch pieces of ⅛ inch thick "Plexiglas" (methyl methacrylate) -type polymer sheets. The 4 by 4 inch area between the "Plexiglas" sheets is then placed in a hydraulic press under a total force of 16,000 pounds for 10 seconds. The so bonded two pieces of bed sheeting are then conditioned for at least 24 hours at 75° F. and 55% relative humidity.

After conditioning, 1 inch wide test strips, having dimensions of 1 by 5 inches, are cut from the bonded pieces. These test strips have a 1 by 4 inch bonded portion and two 1 inch square unbonded cloth tabs. The 1 inch square unbonded cloth tabs are fastened in the clamps of an Instron Tester, Model No. TM, Serial No. 658 and pulled apart perpendicularly to the bonded portion of the sample at a speed of 1 inch per minute. The average force (in pounds) required to pull apart, or peel, the second inch of bonded strip is calculated from the Instron chart. The average force in pounds so determined, is recorded. The numerical average of three such determinations for a latex film is the tack test reported herein.

In describing the clothlike drape of the present quiet, strong clothlike laminates for comparative purposes, drape index tests are used. The drape index, the procedure for which is described below, becomes an increasingly large number as thinner materials of essentially perfect drape are tested. At the other extreme of the drape index scale, the drape index of a stiff sample, for example cardboard, having no draping qualities, is zero.

The procedure for determining drape index consists of first cutting a circular sample having a diameter of 12 inches from the sample to be tested. The center of the circular sample, conditioned at 75° F. and 55% relative humidity, is then secured to the center of a supporting horizontal plate pedestal having a plate diameter of 3 inches and rests thereon and on a supporting wire screen having a 4 inch diameter hole in its center to clear the supporting horizontal plate. Next, the supporting wire screen is lowered away and the circular sample drapes freely without constraint over the supporting horizontal plate and conforms thereto according to its pliability and draping quality. A plastic screen is placed around the draped sample to prevent motion caused by air movement.

In order to obtain numbers for the calculation of a numerical drape index, a Polaroid Land Camera - Model 95A, using 3¼ inch by 4¼ inch Polaroid camera film, is mounted above the supporting horizontal plate with its optical axis perpendicular thereto and in line with the center of the supporting horizontal plate. The camera lens, using a Polaroid No. 1 close-up lens, is mounted at a distance of 29.5 inches above the supporting horizontal plate, so that the undraped circular sample having a 12 inch diameter, centered thereon is in focus and fills the print area. Four individual photographs of each of the supporting horizontal plate with a diameter of 3 inches, the undraped sample with a diameter of 12 inches and the draped sample are taken and developed. In the case of the draped sample, two photographs are taken of each side of the draped sample. The camera position, focus and alignment remains the same for all photographs.

After development of the photographs, the image of each photographed area is carefully cut out with a small scissors, and the cut out images are weighed on an analytical balance to an accuracy of ± 1 milligram. The numerical average of the four image weights for the supporting pedestal, the undraped sample and the draped sample are then individually calculated. The drape index is then calculated by the following formula wherein:

$P$ = numerical average of supporting horizontal plate photographic image weights;

$S_u$ = numerical average of undraped circular sample (wire screen supported) photographic image weights;

$S_d$ = numerical average of draped circular sample photographic image weights; and $$\text{Drape Index} = \frac{(S_u - P) - (S_d - P)}{(S_d - P)}$$

Since the photographic image weight procedure constitutes a precise method of obtaining facsimile values for the areas involved, it is noted that the drape index is the quotient obtained by dividing the decrease in drapeable area that has occurred by the total decrease in area further possible with a sample having perfect drape and zero thickness.

Those skilled in the art of paper and tissue laminate manufacture will readily perceive that, although the quiet, strong clothlike laminates of the present invention have been described primarily in embodiments directed to disposable usages in surgical draping, surgical gowning, clothing, towelling and tenting, there are many other possible usages of such laminates. In fact, the principles, as disclosed herein, can be employed wherever it is described to laminate suitable sheeted fibrous materials such as paper, nonwovens, woven cloth, carded webs and spunbonded webs, etc. and combinations thereof in drapable, pliable laminates.

Therefore, while specific embodiments of the present invention have been described above, it will be apparent that many changes and modifications may be made in the described quiet, strong clothlike laminate structures and components without departing from the spirit of the invention. It will be further understood that the embodiments shown and the procedures set forth for their accomplishment are intended to be illustrative only and are not intended as limiting the scope of this invention, it being intended that all equivalents thereof be included in the scope of the appended claims.

Having thus described the invention, what is claimed is:

1. The quiet, strong clothlike tissue laminate comprising a central layer of continuous filament only lightly bonded or unbonded spunbond nonwoven material, having a basis weight of about 0.3 to about 0.8 oz. per sq. yd., wherein said central layer is impregnated with a liquid emulsion of about 50 to about 120%, based on the fibrous weight of said central layer, of soft, tacky latex binder solids having a glass transition temperature of about 10° C. to about −80° C. and a tack test of about 2 pounds to about 40 pounds, which central layer of continuous filament spunbond nonwoven material is wet combined with, and at low combining pressure joined to, with substantial penetration of said latex binder solids into, between at least two absorbent tissue facing layers each having a basis weight of about 7 to about 18 lbs. per 3000 sq. ft. and subsequently dried.

2. The quiet, strong clothlike tissue filament of claim 1 in which the central layer of continuous filament spunbond nonwoven material has a basis weight of about 0.6 oz. per square yard, wherein said central layer is impregnated with about 85 to about 100% of the soft, tacky latex solids and wherein the central layer of continuous filament spunbond nonwoven material is provided with and bonded to, with substantial penetration of said latex solids into, two facing tissue layers each having a basis weight of about 9 to about 15 lbs. per 3000 sq. ft.

3. The quiet, strong clothlike tissue laminate of claim 2 which exhibits about 1 to about 30% mechanical compaction.

4. The quiet, strong clothlike tissue laminate of claim 2 wherein at least one of the two facing tissue layers is water and alcohol repellent.

5. The quiet, strong clothlike tissue laminate of claim 2 wherein the central layer of continuous filament spunbond nonwoven material contains flame retardant material and the quiet, strong clothlike tissue laminate is flame retardant.

6. The quiet, strong clothlike tissue laminate of claim 2 in which at least one of the two facing tissue layers is dyed.

7. The quiet, strong clothlike tissue laminate of claim 2 having a thickness, expressed in meters, divided by its basis weight, expressed in grams per square meter, within the range of from about $3.4 \times 10^{-6}$ meters$^3$/gram to about $3.7 \times 10^{-6}$ meters$^3$/gram.

8. The quiet, strong clothlike tissue laminate of claim 1 wherein each of said tissue layers comprises a tissue characterized by having impressed in its surface, to a depth of at least 30% of its machine glazed caliper the knuckle pattern of an imprinting fabric having about 20 to about 60 meshes per inch, by having about 1 to about 14% of its surface compressed in said knuckle pattern to a relative density of at least 0.7 and by having a bulk density at 100 grams per square inch loading of about 1.0 to about 3.6, proportional to its basis weight.

9. The quiet, strong clothlike tissue laminate of claim 1 wherein said spunbond nonwoven material is selected from the group consisting of polyester, polyamide and polyolefin fibers.

* * * * *

UNITED STATES PATENT OFFICE
CERTIFICATE OF CORRECTION

PATENT NO. : 4,113,911
DATED : September 12, 1978
INVENTOR(S) : Larry L. LaFitte, James B. Camden It is certified that error appears in the above-identified patent and that said Letters Patent are hereby corrected as shown below:

Column 1, line 15, change "characteristics" to--characteristic--;

column 1, line 66, change "probelm" to--problem--;

column 2, line 27, change "laminati" to--lamination--;

column 3, line 7, after "selection" insert--and--;

column 4, lines 11 and 12, change "attributes, in a liquid emulsion" to--attributes in a liquid emulsion,--;

column 4, line 66, after "latex" insert--liquid emulsion--;

column 6, line 46, after "conventional" insert--absorbent--;

column 7, line 29, change "nether absorbent" to--absorbent nether--.

Signed and Sealed this

Nineteenth Day of December 1978

[SEAL]

Attest:

RUTH C. MASON
Attesting Officer

DONALD W. BANNER
Commissioner of Patents and Trademarks